United States Patent
Zouzal et al.

(10) Patent No.: US 10,602,847 B2
(45) Date of Patent: *Mar. 31, 2020

(54) THORACIC REGION COMFORT SEATING SYSTEM

(71) Applicants: LEAR CORPORATION, Southfield, MI (US); Winsen C. Zouzal, Detroit, MI (US)

(72) Inventors: Winsen C. Zouzal, Detroit, MI (US); Ashford Allen Galbreath, Troy, MI (US); Asad S. Ali, Troy, MI (US); Terry O'Bannon, Royal Oak, MI (US); Gerald Steven Locke, Lake Orion, MI (US); Jennifer Badgley, Waterford, MI (US); Thomas S. Hicks, Livonia, MI (US); Walter T. Cichocki, Brighton Township, MI (US)

(73) Assignee: Lear Corporation, Southfield, MI (US)

( * ) Notice: Subject to any disclaimer, the term of this patent is extended or adjusted under 35 U.S.C. 154(b) by 740 days.

This patent is subject to a terminal disclaimer.

(21) Appl. No.: 14/423,121

(22) PCT Filed: Aug. 22, 2013

(86) PCT No.: PCT/US2013/056120
§ 371 (c)(1),
(2) Date: Feb. 21, 2015

(87) PCT Pub. No.: WO2014/031820
PCT Pub. Date: Feb. 27, 2014

(65) Prior Publication Data
US 2015/0216313 A1  Aug. 6, 2015

Related U.S. Application Data

(60) Provisional application No. 61/692,432, filed on Aug. 23, 2012, provisional application No. 61/717,374, filed on Oct. 23, 2012.

(51) Int. Cl.
A47C 7/46 (2006.01)
B60N 2/66 (2006.01)
B64D 11/06 (2006.01)

(52) U.S. Cl.
CPC ............... *A47C 7/462* (2013.01); *B60N 2/66* (2013.01); *B64D 11/0639* (2014.12)

(58) Field of Classification Search
CPC ..... B60N 2/66; B64D 11/0639; A47C 7/4662; A47C 7/462
(Continued)

(56) References Cited

U.S. PATENT DOCUMENTS 1,205,802 A  11/1916  Silbert
1,673,433 A  6/1928  Wheeler et al.
(Continued)

FOREIGN PATENT DOCUMENTS

CN  86206957 U  7/1987
CN  2072791 U  3/1991
(Continued)

OTHER PUBLICATIONS

Office Action of corresponding Chinese Patent Application No. CN201380042613.5; dated Apr. 6, 2016; 10 pages.
(Continued)

*Primary Examiner* — Jose V Chen
(74) *Attorney, Agent, or Firm* — Brooks Kushman P.C.

(57) ABSTRACT

A seatback assembly is provided having a thoracic support structure. The thoracic support structure includes a center portion extending in an upright direction and is adapted to be positioned adjacent the seatback to align adjacent a thoracic region a user's spine. The center portion is formed of a first foam material having a first hardness. A pair of side portions are disposed adjacent to and connected with the center portion. The side portions are formed of a second foam
(Continued)

material having a second hardness. The first hardness is greater than the second hardness for providing support to the user's spine. An adjustment mechanism is connected to the thoracic support structure for positioning the support structure along the seatback so that the center portion provides support to at least a portion of the thoracic region of the user's spine.

20 Claims, 4 Drawing Sheets

(58) Field of Classification Search
USPC .............................. 297/284.1, 284.2, 284.7
See application file for complete search history.

(56) References Cited

U.S. PATENT DOCUMENTS

| | | | |
|---|---|---|---|
| 1,937,920 A | 12/1933 | Smith | |
| 2,647,560 A | 8/1953 | Huebener | |
| 3,215,468 A | 11/1965 | Swenson et al. | |
| 3,880,463 A | 4/1975 | Shephard et al. | |
| 3,883,257 A | 5/1975 | Delafield | |
| 4,239,282 A | 12/1980 | White | |
| 4,306,750 A | 12/1981 | Wenger et al. | |
| 4,572,578 A | 2/1986 | Perkins | |
| 4,834,455 A | 5/1989 | Proctor | |
| 4,835,801 A | 6/1989 | Walpin et al. | |
| 4,884,846 A | 12/1989 | Tobler | |
| 4,930,173 A | 6/1990 | Woller | |
| 4,981,325 A | 1/1991 | Zacharkow | |
| 5,000,515 A | 3/1991 | Deview | |
| 5,039,158 A | 8/1991 | Maier | |
| 5,452,940 A | 9/1995 | Maier | |
| 5,474,362 A | 12/1995 | Albecker, III | |
| 5,522,645 A | 6/1996 | Dahlbacka | |
| 5,564,144 A | 10/1996 | Weingartner et al. | |
| 5,580,124 A | 12/1996 | Dellanno | |
| 5,833,321 A | 11/1998 | Kim et al. | |
| 5,868,466 A | 2/1999 | Massara et al. | |
| 5,884,968 A | 3/1999 | Massara | |
| 5,975,632 A * | 11/1999 | Ginat .................... | A47C 7/462 297/284.4 |
| 6,419,318 B1 | 7/2002 | Albright | |
| 6,447,058 B1 | 9/2002 | Jackson | |
| 6,530,622 B1 | 3/2003 | Ekern et al. | |
| 6,565,153 B2 | 5/2003 | Hensel et al. | |
| 6,565,157 B2 | 5/2003 | Barile, Jr. et al. | |
| 6,688,686 B1 | 2/2004 | McEvoy et al. | |
| 6,910,741 B2 | 6/2005 | Footitt | |
| 6,938,956 B1 * | 9/2005 | Piretti .................... | A47C 7/38 297/230.14 |
| 6,945,601 B1 * | 9/2005 | Wu ........................ | A47C 7/38 297/284.1 |
| 7,128,372 B2 | 10/2006 | Farquhar et al. | |
| 7,213,880 B2 | 5/2007 | Schmitz et al. | |
| 7,413,250 B2 | 8/2008 | Connolly et al. | |
| 7,429,080 B2 | 9/2008 | Walker et al. | |
| 7,445,008 B1 | 11/2008 | Walker | |
| 7,445,292 B2 | 11/2008 | Moule | |
| 7,690,731 B2 | 4/2010 | Kuester | |
| 7,862,120 B2 | 1/2011 | Ueda | |
| 7,874,618 B2 | 1/2011 | Kohl et al. | |
| 7,878,590 B1 | 2/2011 | Bilak | |
| 7,967,379 B2 * | 6/2011 | Walters ................ | A47C 1/023 297/284.3 |
| 8,261,386 B2 | 9/2012 | Kardos | |
| 8,690,249 B2 | 4/2014 | Kang et al. | |
| 8,764,110 B2 * | 7/2014 | Hsuan-Chin ............. | A47C 7/44 297/284.7 |
| 8,931,837 B2 | 1/2015 | Vernon | |
| 2005/0062323 A1 * | 3/2005 | Dicks ....................... | A47C 7/38 297/284.4 |
| 2006/0103204 A1 | 5/2006 | Walker et al. | |
| 2007/0222265 A1 | 9/2007 | Machael et al. | |
| 2008/0315644 A1 | 12/2008 | Briscoe | |
| 2009/0051199 A1 | 2/2009 | Crosbie | |
| 2010/0164266 A1 | 7/2010 | Walters et al. | |
| 2011/0018329 A1 | 1/2011 | Galbreath et al. | |
| 2011/0101745 A1 | 5/2011 | Chen | |
| 2013/0125313 A1 | 5/2013 | Yamasaki et al. | |
| 2013/0302584 A1 | 11/2013 | LaFlamme et al. | |
| 2015/0069810 A1 | 3/2015 | Yamasaki et al. | |
| 2015/0080994 A1 | 3/2015 | Ho | |
| 2015/0320219 A1 | 11/2015 | Berns | |
| 2016/0031351 A1 * | 2/2016 | Galbreath ................ | B60N 2/64 297/284.1 |

FOREIGN PATENT DOCUMENTS

| | | |
|---|---|---|
| CN | 1847049 A | 10/2006 |
| CN | 101128138 A | 2/2008 |
| CN | 201438906 U | 4/2010 |
| CN | 102271554 A | 12/2011 |
| DE | 102008037231 A1 | 2/2010 |
| DE | 102011102122 A1 | 11/2012 |
| DE | 102013209465 A1 | 7/2014 |
| GB | 2197659 A | 5/1988 |
| GB | 2275416 A | 8/1994 |
| JP | 3142619 U | 6/2008 |
| WO | 2007030893 A1 | 3/2007 |
| WO | 2011130264 A1 | 10/2011 |
| WO | 2012019823 A1 | 2/2012 |

OTHER PUBLICATIONS

First Office Action of corresponding Chinese Application No. CN 201380042609.9; dated May 17, 2016; 12 pages.
U.S. Appl. No. 14/423,120 Final Office Action dated Nov. 8, 2016; 12 pages.
International Search Report and Written Opinion of corresponding International Application No. PCT/US2013/056120; dated Feb. 3, 2015; 8 pages.
International Search Report and Written Opinion of corresponding International Application No. PCT/US2013/056119; dated Jan. 17, 2014; 8 pages.
European Search Report for EP Application No. 13831194.9; dated Apr. 5, 2016; 8 pages.
European Search Report for EP Application No. 13830750.9; dated Apr. 6, 2016; 7 pages.
Chinese Office Action CN 201380042609.9 dated Feb. 4, 2017; 16 pages.
European Examination Report EP 13831194.9 dated Feb. 10, 2017; 5 pages.
U.S. Appl. No. 14/423,120 NFOA dated May 13, 2016; 11 pages.

* cited by examiner

FIG. 8

| Component | Description | Nominal Density (kg/m³) | Hardness Range* (N) |
|---|---|---|---|
| Side portion | A17340NL/Type 1 Laminatied foam - FXI | 25 | 70-90 |
| Center portion | Q-31 Slab foam - Carpenter | 42 | 125-145 |
| | Q-41 Slab foam - Carpenter | 41 | 150-175 |
| | Q-51 Slab foam - Carpenter | 50 | 200-225 |

* 25% hardness test on 400x400x100mm foam block

THORACIC REGION COMFORT SEATING SYSTEM

CROSS-REFERENCE TO RELATED APPLICATION

This application is the U.S. national phase of PCT Application No. PCT/US2013/056120 filed on Aug. 22, 2013, which claims the benefit of U.S. Provisional Patent Application Nos. 61/692,432 filed on Aug. 23, 2012 and 61/717,374 filed on Oct. 23, 2012, the disclosures of which are incorporated in their entirety by reference herein.

TECHNICAL FIELD

The present application is directed to a thoracic region support system for a seatback.

BACKGROUND

In a seated position, the thoracic region of a person's spine is required to support much of the person's upper body mass. When seated for extended periods of time, such as at a desk or on an airplane, the muscles of the person's upper body and vertebrae and discs in the lumbar region and pelvic region of the spine can become significantly fatigued.

BRIEF DESCRIPTION OF THE DRAWINGS

FIG. 8 is a chart of an example of material properties for a seatback support system.

DETAILED DESCRIPTION

As required, detailed embodiments of the present invention are disclosed herein; however, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Moreover, except where otherwise expressly indicated, all numerical quantities in this disclosure are to be understood as modified by the word "about" in describing the broader scope of this invention. Practice within the numerical limits stated is generally preferred. Also, unless expressly stated to the contrary, the description of a group or class of materials by suitable or preferred for a given purpose in connection with the invention implies that mixtures of any two or more members of the group or class may be equally suitable or preferred.

It is believed that supporting the thoracic region of the spine can reduce forces and support as much as one-third of the upper body mass. By increasing support of the upper body mass, loads are reduced on the muscles, vertebrae and discs in the lumbar region and pelvic region of the spine. Decreased load reduces fatigue on these areas of the body. The current prevalent comfort back supporting technology for the furniture and transportation market focuses on the lumbar (lower) region of the back to provide relief from fatigue. With the change from a primarily labor intensive work force to one of computer using desk workers we see an increase in upper back discomfort and a decrease in lower back discomfort. This is driving the need for an improvement in the location of the seating support system designed to provide relief for fatigue and the resultant discomfort.

Figure 1:
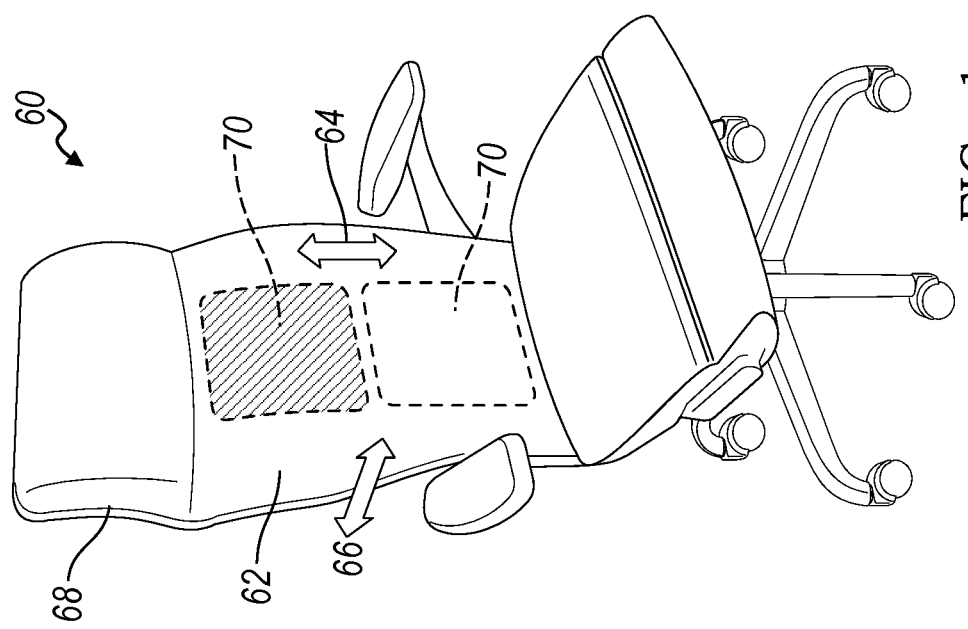
FIG. 1 illustrates a front perspective view of an example of an adjustable support system for a seatback according to one embodiment of the present disclosure.
Figure 5:
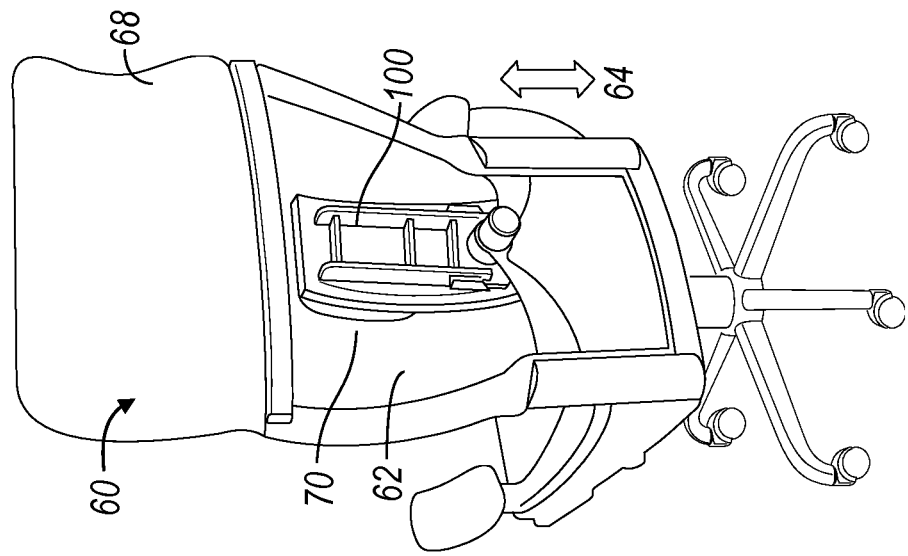
FIG. 5 illustrates a rear perspective view of the adjustable support system of FIG. 1 according to another embodiment.
Figure 4:
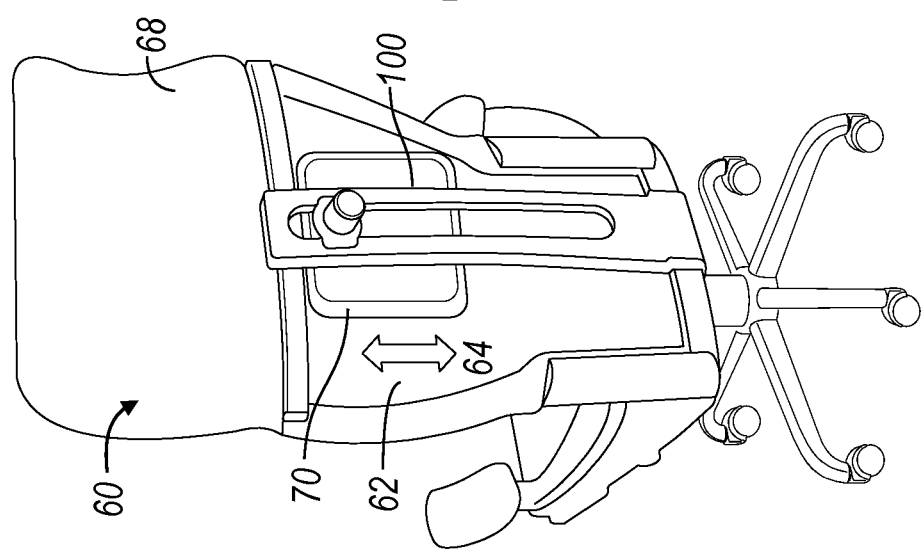
FIG. 4 illustrates a rear perspective view of the adjustable support system of FIG. 1 according to another embodiment.

A comfort seating system for seating for furniture or comfort vehicular seating systems, such as in office, automotive or aircraft seating, provides supporting pressure along the thoracic region of the user's spine between the T2 to T12 vertebrae, as shown in FIG. 1. This system can be either static, non-adjustable, or adjustable to accommodate a wider variety of occupant sizes.

The support structure is to be positioned along the thoracic region of a seat back when the user is seated. In at least one embodiment, the support structure has a harder center portion and softer side portions. In this embodiment, the center portion is intended to provide spinal support while the side portions are designed to allow the area along either side of the spine to sink in with less resistance than in the center portion. In at least this embodiment, the support structure is formed of different density and different hardness foams so that the center portion has a higher density and higher hardness foam than the foam forming the side portions. The support structure can be used in a variety of seating systems. Some exemplary seating systems and components are shown and described below.

There are four main factors that affect subjective comfort: 1) smoothness of the pressure integral; 2) sufficiency of the pressure change; 3) ability to create even pressure for a wide range of anthropometry; and 4) ergonomic/control suitability of actuation.

A thoracic region comfort seating system design is focused on addressing subjective comfort factors. Smoothness of the pressure integral is accomplished by having a centroid of supporting high pressure with a lower pressure zone surrounding either side of the central support to promote a feeling of smooth transition from center to outer sides. In this manner, the occupant will experience relatively little discomfort from feeling the hardness transition between parts of the design. In addition, by supporting the thoracic region, the user's muscular ligamentous structures are supported which may increase biomechanical abilities and efficiencies for the muscular, physiological and neurological systems.

Sufficiency of the pressure change and the need to create even pressure for a wide range of anthropometry can be accommodated by either having the degree of pressure adjustable, or if not adjustable, designed design for a fiftieth male and female population location of the thoracic region, thereby minimizing the possibility of larger or smaller occupants experiencing discomfort. Ergonomic control and suitability of actuation may be accomplished by having the ability to control pressure and location by moving the adjustable unit up, down, forward and rearward with intuitive hand controls.

As shown in FIG. 1, the adjustable support system 60 includes an adjustable thoracic support structure 70 having a rectangular shape. The thoracic support structure 70 is adjustable in the vertical or upright direction, as indicated by arrow 64, and can also be adjusted in the fore-aft direction 66. The ability to coordinate the placement of thoracic support structure 70 has impact on the comfort factors. Being able to vary the location of the thoracic support structure 70 up and down also improves the ability to address large anthropometric variation in the population. The seatback 62 may also include a headrest portion 68 located adjacent the thoracic support structure 20 in the vertical direction.

Figure 2:
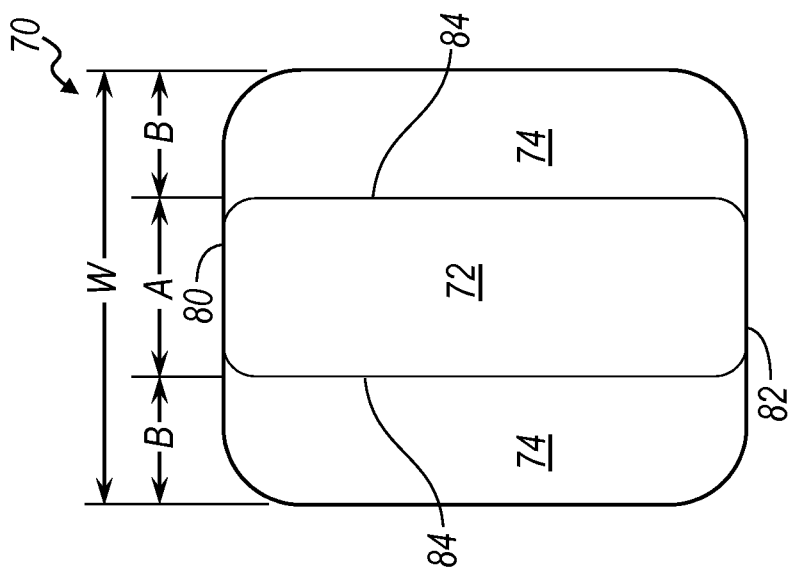
FIG. 2 is schematic illustrations of the thoracic support structure for the adjustable support system of FIG. 1.

FIG. 2 illustrates a schematic view of the adjustable thoracic support structure 70. The adjustable thoracic support structure 70 has a center portion 72 and outer side portions 74. In at least one embodiment, the center portion 72 is formed of higher density and higher hardness foam than the outer side portions 74. The higher hardness of the center portion 72 is more supportive and has more resistance to deflection. The center portion 72 provides support to the thoracic region of the user's spine. The side portions 74 are softer and less dense and provide shoulder blade relief to the user.

The outer portions 74 may be formed along the lateral sides 84 of the center portion 72. It is also contemplated that the outer portions 74 can enclose the center portion 72 surrounding the periphery of the center portion 72. As illustrated, the center portion 72 and outer side portions 74 may be rectangular shaped. However, the center portion 72 may be any suitable shape, such as oblong, diamond-shaped, cylindrical, triangular, elliptical, tear-shaped or trapezoidal, for example.

In the illustrated embodiment, the thoracic support structure 70 has a vertical length L of generally thirteen inches, or approximately 33 centimeters, a width W along the top 80 the bottom 82 of eight inches, or approximately 20 centimeters. In another embodiment, the support structure 70 has a maximum overall width W of 10 centimeters to 40 centimeters and a length L of 20 centimeters to 55 centimeters, and in other embodiments a width W of 15 centimeters to 25 centimeters and a length of 25 centimeters to 40 centimeters. In at least one embodiment illustrated in FIG. 2, the center portion 72 has a constant width A of three inches, or approximately 8 centimeter and the side portions 74 have a constant width B of 2.5 inches, or approximately 6 centimeters. In another embodiment, the center portion 72 has a width A of 6 centimeters to 12 centimeters wide; with the side portions 74 each having a width B of 4 centimeters to 10 centimeters.

In at least the illustrated embodiment in FIG. 2, embodiment, the thoracic support structure 70 is the shape of a square, or rectangle having a low aspect ratio. It is also contemplated however that the thoracic support structure 70 may have any suitable shape such as, but not limited to, a rectangle having a higher aspect ratio, a trapezoid, an inverted trapezoid, a triangle, a circle, or other suitable shape.

In at least the illustrated embodiment, the adjustable thoracic support structure 70 is molded with a profile having a convex A-surface 76 and a flat B-surface 78. The A-surface 76 is the surface closest to the user, whereas the B-surface 78 faces away from user. FIG. 2A shows a vertical cross section of the thoracic support structure 70. In the vertical cross-section, the A-surface 76 is convex with an apex 88 located at distance of one-third of the overall length measured from a top 80 of thoracic support structure 70.

Figure 2B:
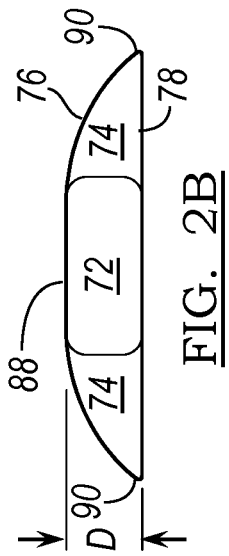
FIG. 2B is a top view of the thoracic support structure of FIG. 2.
Figure 2A:
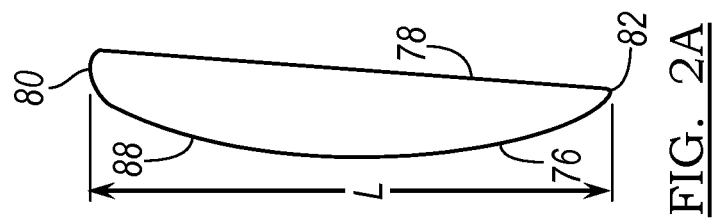
FIG. 2A is a side view of the thoracic support structure of FIG. 2.

FIG. 2B shows a horizontal cross-section of the thoracic support structure 70. In the horizontal cross-section, the A-surface 76 is convex having an apex 88 generally centered along the width of the thoracic support structure 70.

In one embodiment, the thoracic support structure 70 can have an overall dimension where the thickness of the thoracic support structure 70 is one inch, or approximate 2.5 centimeters, and tapers to a rounded side or radius along each of the vertical sides 90 and tapers to the top 80 and the bottom 82. In at least one other embodiment, the center portion 72 has a width from 2 centimeters to 5 centimeters.

In the embodiment pictured in FIG. 2, the center portion 72 may have a generally constant thickness and a lateral width of three inches, or approximately 8 centimeters. In another embodiment, the center portion 72 may have a thickness that is greater than the thickness of the outer side portions 74.

In one embodiment, the surface area ratio of the surface area of the side portions 24 to the surface area of the center portion 22 may be approximately two-to-one. While examples of dimensions of the thoracic support structure 70 are described herein and further illustrated in FIG. 2, is also contemplated that the dimensions of the thoracic support structure 70 may vary depending on the size of the chair or other environmental factors.

The adjustable thoracic support structure 70 can be moved in the vertical or upright direction 64 to adjust for the specific height, body proportions and comfort preferences of the user. In one embodiment, the thoracic support structure 70 can travel in the upright direction 64 on guide rails 100, as shown in FIGS. 3-7. The thoracic support structure 70 may also be adjustable and locked in the upright direction 64 with a locking member such as an adjustment knob 102 that applies pressure or impinges on the guide rails 100. In another embodiment, the thoracic support structure 70 may be adjustable with a screw-driven pressure adjustment feature that provides a substantially infinite adjustment and locking positions. However, any suitable adjustment mechanism and locking device may be used to position the thoracic support structure 70.

Figure 3:
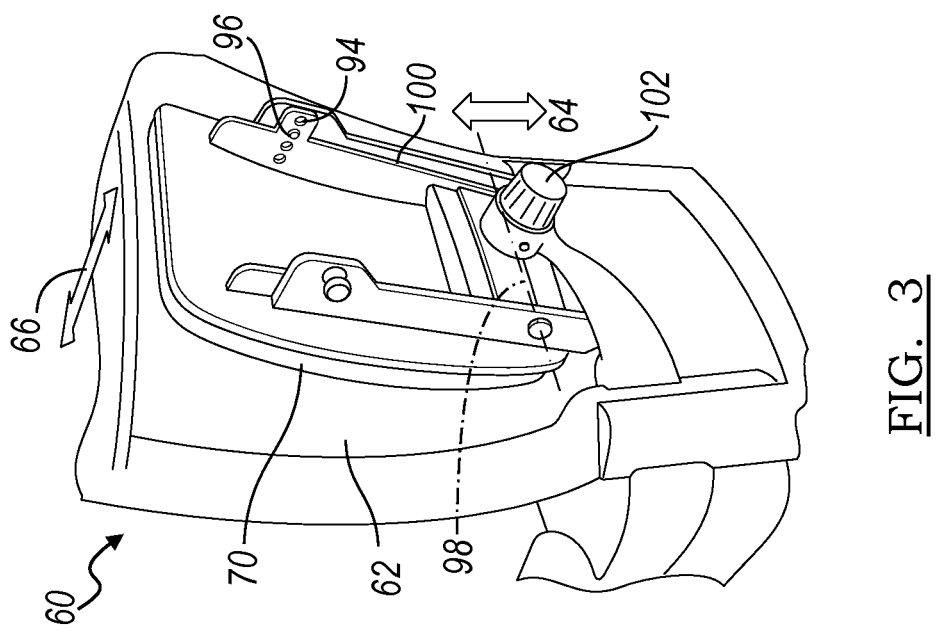
FIG. 3 illustrates a rear perspective view of the adjustable support system of FIG. 1 according to one embodiment.

The adjustable thoracic support structure 70 can also be adjusted in the foreand aft directions 66 to adjust pressure. As shown in FIG. 3, the thoracic support structure 70 can move or pivot in a cantilevered motion and can be locked into place using set pins 94. The adjustable thoracic support structure 70 may include a plurality of adjustment apertures 96 to cooperate with the set pins 84 in order to provide multiple positions in the fore and aft directions 66.

In the embodiment illustrated in FIG. 3, the support structure may pivot axis 98 formed by a lateral pivot pin, for example. The adjustment handle of knob 102 moves an adjustment screw forward when rotated, thereby moving the support structure 70 in arc in the forward direction 66. When the support structure 70 is rotated in the forward direction 66, this adjustment of the support structure 70 may provide additional support and lift to the thoracic area of the user's spine.

Figure 6:
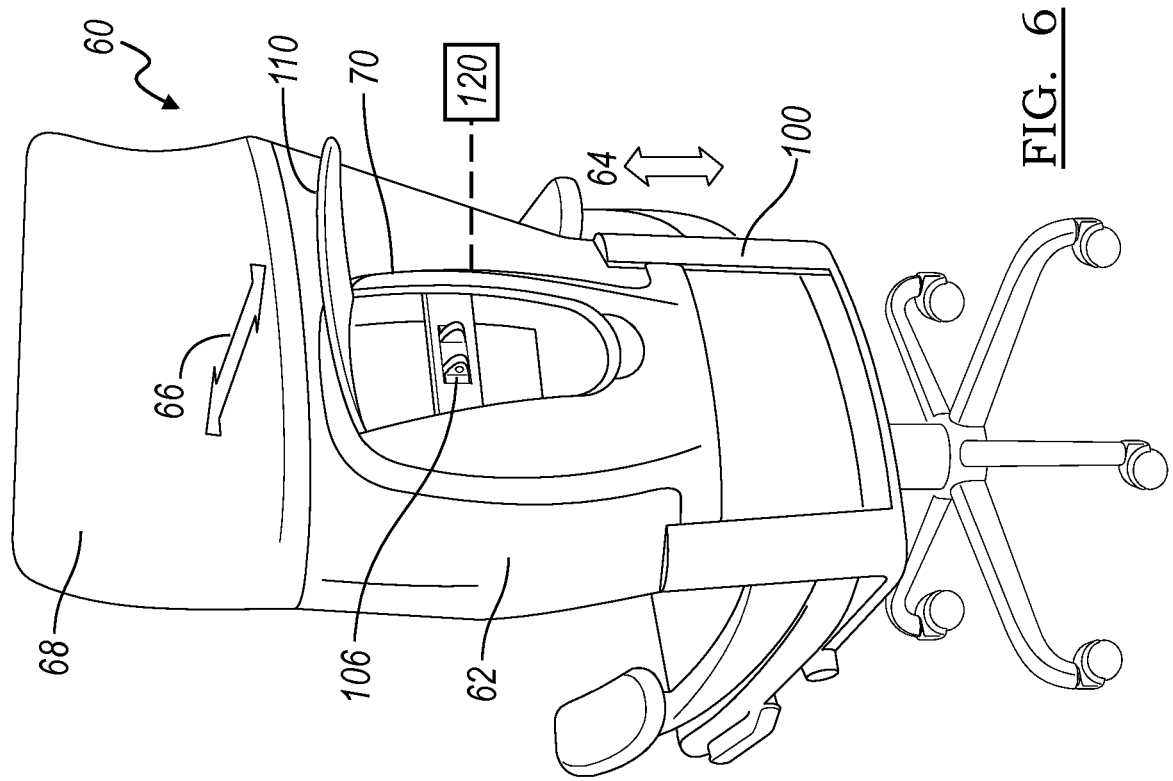
FIG. 6 illustrates a rear perspective view of the adjustable support system of FIG. 1 according to another embodiment.

FIG. 6 illustrates another embodiment of the adjustable seating support system 60. In the embodiment shown in FIG. 6, movements in the fore and aft direction 66 can also be controlled by pinch activated release tabs 106. The released tabs 106 may be spring-loaded to lock the position of the thoracic support structure 70 when released. FIG. 6 illustrates an adjustable seating support system 60 includes a cover 110 to conceal the release tabs 106 or any other adjustment mechanisms in the adjustable seating support system 60.

The support structure 70 may be adapted to move in the fore-aft direction 66 in a linear motion to provide adjustable support and lift to the thoracic area user's spine and to provide firmer support. By moving in a linear motion, the support structure 70 may remain generally parallel to the seatback 62 as the support structure 70 move in the fore-aft direction 66. The support structure 70 moves in the fore-aft direction 66 along the axis of a screw as the screw is rotated by and handle, for example. The thoracic support structure 70 and linear motion screw may be mounted at an angle to the setback 62 back such that support structure 70 also provides a slight lifting motion as the support structure 70 travels forward in the fore-aft direction.

The adjustable seat support system 60 may also include a remote control system 120 to control the position of the thoracic support structure 70 so that the user can position the thoracic support structure 70 while seated in order to provide optimal ergonomic support. The remote control system 120 may include a power mechanism or a cable system, or any suitable system for providing remote control.

Figure 7:
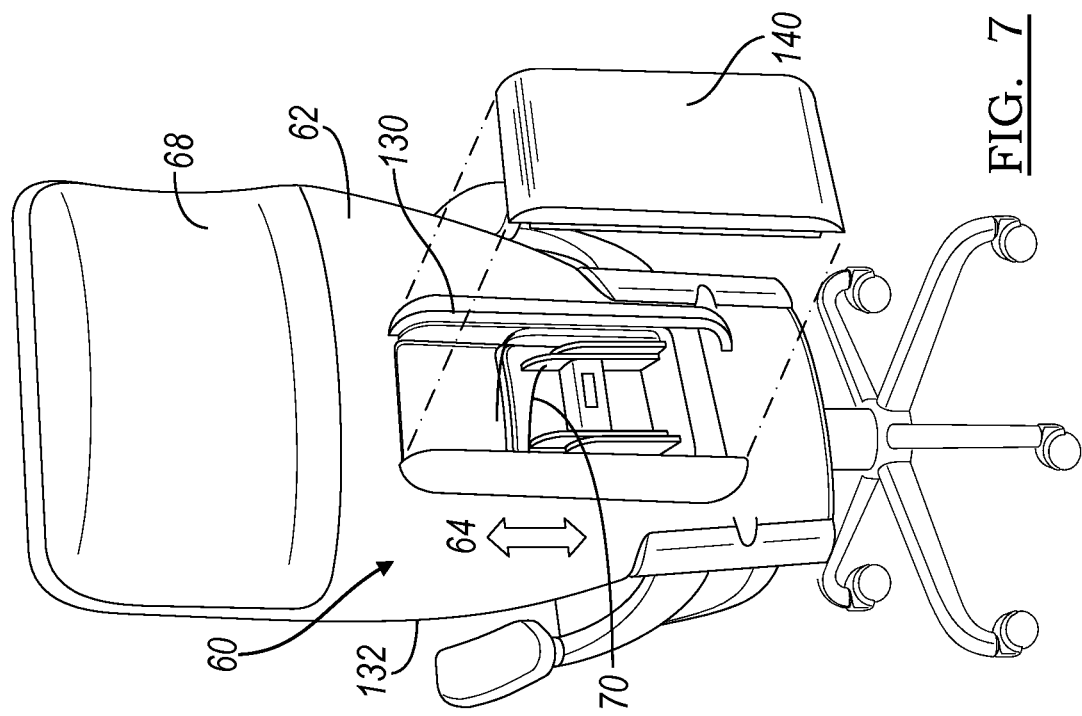
FIG. 7 illustrates a rear perspective view of an adjustable support system for a seatback according to the one embodiment.

In another embodiment as shown in FIG. 7, the adjustable seat support system 60 and thoracic support structure 70 can be integrated into the primary seatback. For example, the guide rails 130 may be integrally formed in a support frame 132 of the seatback. Likewise, the thoracic support structure 70 may be disposed within the seatback covering and located adjacent to any padding in the seatback. FIG. 7 illustrates an adjustable seating support system 60 that includes a cover 140 to conceal a release mechanism 134 and the thoracic support structure 70 in the adjustable seating support system 60.

For the adjustable system 70, the material properties of the center portion 72 and the side portions 74 are described in FIG. 8. The center portion 72 and the side portion 74 can have any suitable material properties. For example, in at least one embodiment the center portion can have a density of 35 to 70 kilogram per cubic meter ($kg/m^2$) and a hardness of 100 to 300 Newtons (N). Likewise, the side portions can have a density of 20 to 60 $kg/m^2$ and a hardness of 60 to 100 N. Hardness can be measured by a hardness test of 25% dimensional thickness deflection of 40 millimeters by 40 millimeters by 10 millimeters block with an 8 inch circular platen. In at least one other embodiment, the center portion has a density of 40 to 60 $kg/m^2$ and a hardness of 125 to 175 N, as measured by the hardness test described above, with the side portions. The density and hardness may be measure by ASTM standard 3574, or any reliable measurement standard or technique. In at least one embodiment, the hardness of the center portion may be generally 150% to 250% more than the hardness of the side portions.

In at least one embodiment, to achieve the desired hardness, the center portion 72 may be formed of carpenter slab foam, such as Q-31, Q-41 or Q-51 foam, as shown in FIG. 8. However, it is also contemplated that the center portion 72 may be formed of any suitable material that exhibits suitable hardness for supporting the spine of the user. The area of the seatback 62 surrounding the support member 70 can be made from conventional urethane foam, non-woven polyester, or other standard seating material compositions and thicknesses, depending on intended use, environmental factors, other component compatibility, etc.

In at least one embodiment, the side portions 74 may be formed of a continuous cast of slab molded laminate-type foam such as Type 1 A17340NL, as illustrated in FIG. 8. However, it is also contemplated that the outer side portions 74 may be formed of any suitable material, such as gel for example, that allows for the muscle, bone and tissue surrounding the spine of the user to sink in or penetrate with less resistance than the center portion 72.

While the center portions 72 and side portions 74 are mainly described as being made of a suitable foam material, it is contemplated that one or more of the portions could be formed of another suitable material, such as gel, nonwoven material pads made from polyester, wool, cellulose, or other natural fibers, or air or other suitable fluid-filled bladders.

While the structure 70 is illustrated as having segmented foam blocks, it should be understood that the hardness and density could be provided as gradients such that relatively gradual transitions occur between the adjacent foam pieces.

The details, designs, variants, aspects and embodiments shown and described herein are applicable to automotive, other vehicle, and non-regulated seating.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

We claim a seat system or a thoracic region support seating system comprising any combination of features shown in the figures and/or described in the application.

What is claimed is:

1. A seatback assembly comprising:
    a thoracic support structure adapted to be secured to a seatback, the support structure including:
        a center portion extending in an upright direction and adapted to be positioned adjacent the seatback to align adjacent a thoracic region a user's spine, the center portion having a first hardness;
        a pair of side portions each disposed adjacent to and connected with the center portion, the side portions having a second hardness, wherein the first hardness is greater than the second hardness for providing support to the user's spine,
        wherein the side portions and center portion define a smooth convex profile in a transverse direction from a first edge to a second edge of the support, wherein an apex of the smooth convex profile is defined along the center portion; and
    an adjustment mechanism connected to the thoracic support structure for positioning the support structure along the seatback so that the center portion provides support to at least a portion of the thoracic region of the user's spine.

2. The seatback assembly of claim 1 wherein the adjustment mechanism includes at least one rail extending in the upright direction and adapted to be secured to the seatback, wherein the thoracic support structure is moveable along the at least one rail in the upright direction to provide support to at least a portion of the thoracic region of the user's spine.

3. The seatback assembly of claim 1 wherein the adjustment mechanism includes a fore-aft adjustment member for moving the support structure in a fore-aft direction relative to the seatback in order to vary the amount of support that the center portion provides to the thoracic region of the user's spine.

4. The seatback assembly of claim 1 wherein the adjustment mechanism includes an upright adjustment member for moving the support structure in the upright direction along the seatback and a fore-aft adjustment member for moving the support structure in a fore-aft direction relative to the seatback.

5. The seatback assembly of claim 1 wherein the center portion is formed of a first foam material having a first density and the side portions are formed of a second foam material having a second density, wherein the first density is greater than the second density.

6. The seatback assembly of claim 1 wherein the center portion includes a convex profile in the upright direction along a support surface.

7. The seatback assembly of claim 1 wherein the first hardness of the center portion is 150% to 250% greater than the second hardness of the center portion.

8. A seatback assembly comprising:
a thoracic support structure adapted to be secured to a seatback, the support structure including:
a center portion extending in an upright direction and adapted to be positioned adjacent the seatback to align adjacent a thoracic region a user's spine, the center portion formed of a first foam material having a first hardness;
a pair of side portions each disposed adjacent to and connected with the center portion, the side portions formed of a second foam material having a second hardness, wherein the first hardness is greater than the second hardness for providing support to the user's spine, wherein the side portions and center portion define a smooth convex profile in a transverse direction from a first edge to a second edge of the support, wherein an apex of the smooth convex profile is defined along the center portion; and
an adjustment mechanism connected to the thoracic support structure for positioning the support structure along the seatback so that the center portion provides support to at least a portion of the thoracic region of the user's spine.

9. The seatback assembly of claim 8 wherein the first foam material has a first density being harder than a second density of the second foam material.

10. The seatback assembly of claim 8 wherein first hardness of the center portion is 150% to 250% greater than the second hardness of the side portions and center portion define a convex profile in a transverse direction from a first edge to a second edge of the support, wherein an apex of the transverse convex profile is defined along the center portion.

11. The seatback assembly of claim 8 wherein the adjustment mechanism includes at least one rail extending in the upright direction and adapted to be secured to the seatback, wherein the thoracic support structure is moveable along the at least one rail in the upright direction to provide support to at least a portion of the thoracic region of the user's spine.

12. The seatback assembly of claim 11 wherein the adjustment mechanism includes a locking member for securing the thoracic support structure along the at least one rail in an adjusted position for the user.

13. A seat comprising:
a seatback;
a thoracic support structure positioned adjacent the seatback and including:
a center portion extending in an upright direction and adapted to be positioned adjacent a seatback a user's spine, the center portion formed of a first foam material having a first hardness; and
a pair of side portions each disposed adjacent to and connected with the center portion, the side portions formed of a second foam material having a second hardness, wherein the first hardness is greater than the second hardness for providing support to the user's spine, wherein the side portions and center portion define a smooth convex profile in a transverse direction from a first edge to a second edge of the support, wherein an apex of the smooth convex profile is defined along the center portion; and
an adjustment mechanism connected to the thoracic support structure and the seatback for positioning the support structure along the seatback so that the center portion provides support to at least a portion of a thoracic region of the user's spine.

14. The seat according to claim 13 wherein the first foam material has a first density being harder than a second density of the second foam material.

15. The seat according to claim 14 wherein the seatback is formed of a mesh material having a third hardness being less than the second hardness of the side portions.

16. The seat according to claim 13 wherein the adjustment mechanism includes at least one rail extending in the upright direction and being secured to the seatback, wherein the thoracic support structure is moveable along the at least one rail in the upright direction to provide support to at least a portion of the thoracic region of the user's spine.

17. The seat according to claim 13 wherein the adjustment mechanism includes an upright adjustment member for moving the support structure in the upright direction along the seatback and a fore-aft adjustment member for moving the support structure in a fore-aft direction relative to the seatback.

18. The seat according to claim 13 wherein the adjustment mechanism includes a fore-aft adjustment member for moving the support structure in a fore-aft direction relative to the seatback in order to vary the amount of support that the center portion provides to the thoracic region of the user's spine.

19. The seat according to claim 18 wherein the fore-aft adjustment member includes a pivot axis such that the thoracic support structure rotates about the pivot axis in the fore-aft direction.

20. The seat according to claim 18 wherein the fore-aft adjustment member moves the thoracic support structure linearly in the fore-aft direction.

* * * * *